United States Patent [19]

Lin

[11] Patent Number: 5,200,069

[45] Date of Patent: * Apr. 6, 1993

[54] SEPARATIONS MATERIAL

[76] Inventor: GwoChung Lin, 3521 Salisbury Ct., Wexford, Pa. 15090

[*] Notice: The portion of the term of this patent subsequent to Apr. 18, 2006 has been disclaimed.

[21] Appl. No.: 745,469

[22] Filed: Aug. 13, 1991

Related U.S. Application Data

[63] Continuation of Ser. No. 294,344, Dec. 28, 1988, abandoned.

[51] Int. Cl.$^5$ ............................................. B01D 15/08
[52] U.S. Cl. .............................. 210/198.2; 210/502.1; 210/635; 210/656; 423/629
[58] Field of Search .................. 423/629; 23/305 A; 210/635, 656, 198.2, 502.1, 263

[56] References Cited

U.S. PATENT DOCUMENTS

| | | | |
|---|---|---|---|
| 3,065,185 | 11/1962 | Burns et al. | 252/428 |
| 3,664,967 | 5/1972 | Stehl | 252/431 R |
| 3,984,349 | 10/1976 | Meiller | 210/656 |
| 4,045,353 | 8/1977 | Kosaka et al. | 210/502 |
| 4,159,966 | 7/1979 | Roberts | 252/430 |
| 4,245,005 | 1/1981 | Regnier et al. | 428/420 |
| 4,267,032 | 5/1981 | Burk | 208/113 |
| 4,324,681 | 4/1982 | House | 252/184 |
| 4,517,241 | 5/1985 | Alpert | 428/332 |
| 4,672,042 | 6/1987 | Ross | 210/198.2 |
| 4,673,734 | 6/1987 | Tayot et al. | 530/364 |
| 4,786,628 | 11/1988 | Wieserman et al. | 502/401 |
| 4,788,176 | 11/1988 | Wieserman et al. | 502/401 |
| 4,822,593 | 4/1989 | Wilhelmy | 210/656 |
| 4,900,537 | 2/1990 | Wilhelmy | 423/629 |
| 4,913,935 | 4/1990 | Lin | 427/221 |

FOREIGN PATENT DOCUMENTS

| | | | |
|---|---|---|---|
| 1065733 | 4/1967 | United Kingdom | 423/629 |
| 1107875 | 3/1968 | United Kingdom | 423/629 |

OTHER PUBLICATIONS

Mikes' Laboratory Handbook of Chromatographic and Allied Methods, John Wiley and Sons, New York, 1979, p. 293.

Bien-Vogelsang, U. et al, "Syntheses of Stationary Phases for Reversed-Phase LC Using Silanization and Polymer Coating", Max-Planck-Institut, Chromatographia, vol. 19, pp. 170-179.

Schomburg, G. et al, "Immobilization of Stationary Liquids on Silica Particles by Gamma-Radiation", Max-Planck-Institut, Chromatographia, vol. 18, No. 5, 1984, pp. 265-274.

Figge, H. et al, "Stationary Phases for Reversed-Phase Liquid Chromatography, Coating of Silica by Polymers of Various Polarities", Journal of Chromatography, 351, 1986, pp. 393-408. (Max-Planck-Institut).

Primary Examiner—Ernest G. Therkorn
Attorney, Agent, or Firm—Sheldon H. Parker

[57] ABSTRACT

The invention includes novel separations material of stable polybutadiene coated and crosslinked on a surface of generally spherical metal oxide/hydroxide support particles comprising crystals of metal oxide/hydroxide with the crystals extending radially outward from a central core region and having a shape selected from principally acicular to principally lamellar. A chromatographic packing material for performing high performance liquid chromatography in the reverse phase of polybutadiene coated on alumina in accordance with the present invention provides highly symmetrical chromatogaphic peaks.

18 Claims, 1 Drawing Sheet

SEPARATIONS MATERIAL

This is a continuation of application Ser. No. 07/294,344 filed on Dec. 28, 1988, now abandoned.

BACKGROUND OF THE INVENTION

This invention relates to novel compositions including, in one aspect, novel compositions useful as separations media.

Separations media for separation process applications, including separations column packing materials for reverse phase chromatography columns, can be supplied from organic resins. However, these organic resin packing materials have certain drawbacks including poor physical strength, poor thermal stability, high cost, solvent swelling, and low capacity.

Separations media including chromatographic packing materials made from metal oxides overcome some of the problems related to organic resins but have some problems of their own. For example, silica-based separations column packing materials exhibit poor chemical stability at high pH values. Although silica-based separation materials are dominant in the marketplace for reverse phase column packings, silica-based separation materials have shortcomings of a relatively narrow operating pH range, e.g., such as about 2-8, and a high pressure drop requirement through the separations column. The narrow operating pH range of silica-based separation materials usually results in shorter column life, loss of separations versatility, and difficulty in the cleanup with strong alkali and acid for cost effective, high speed analytical, semi-preparative and preparative purification of samples. A high pressure drop of the silica-based materials also limits the ultimate speed and separation capabilities of the chromatography column.

Metal oxides such as alumina have been used as adsorbents because of good physical integrity and low cost. Aluminas have been used frequently as separations media, including separations media in classical adsorption chromatography. However, the use of aluminas as separations media for modern high performance liquid chromatography in the reverse phase has not been as successful as silica. Reverse phase chromatography involves adsorption on an adsorbent less polar than the eluting solvent. Contrastingly, normal phase chromatography involves an adsorbent more polar than the eluting solvent. In reverse phase chromatography, the more non-polar sample components interact more with the relatively non-polar column packing and thus elute later than polar sample components. The diminished use of aluminas as separations media in high performance chromatography in the reverse phase is because alumina is not easily converted to a hydrophobic phase for selective chromatographic separations via chemical bonding the surface by various hydrocarbon groups, e.g., alkyl or phenyl. Most silanization reagents used successfully with silica show no reactivity toward aluminas. Although chlorosilanes react with alumina, the formed Al(—O—Si—C) bond is known to be highly unstable under reverse phase chromatographic conditions.

U.S. Pat. No. 4,045,353 discloses that the prior art suggests solid supports having cores coated with a porous silica surface and solid supports coated or chemically bonded with an organic compound or organic polymer gel have been used to meet the requirements of high speed liquid chromatography. The patent discloses a solid support prepared by immersing an inorganic substrate in a radiation-polymerizable monomer. Suitable polymerizable monomers include the ethylenically unsaturated monomers, e.g., such as styrene monomer, fluorine monomer, silicon-containing monomer, acrylates, methacrylates, vinyl monomer, olefin monomers, diene monomers, e.g., such as butadiene, isoprene, 1,3-pentadiene, cyclopentadiene, chloroprene, or other monomers capable of being radiation polymerized such as the aldehydes, ketones, cyclic ethers, or the like. Such a polymer can be grafted (the patent discloses) on a substrate of "silica, silica gel, alumina, diatomaceous earth, zeolite, porous glass, carbon black, active carbon, clay, etc."

It is an object of the present invention to provide novel materials useful as separations media in a packed bed.

It is another object of the present invention to provide a novel composition useful as a reverse phase chromatographic column packing material.

It is a further object of the present invention to provide a reverse phase chromatographic column packing material which overcomes the problems of prior art column packing materials.

These and other objects of the present invention will become apparent from the detailed description which follows.

SUMMARY OF THE INVENTION

The invention includes novel separations material of stable polybutadiene coated and crosslinked on a surface of generally spherical metal oxide/hydroxide support particles comprising crystals of metal oxide/hydroxide with the crystals extending radially outward from a central core region and having a shape selected from principally acicular to principally lamellar. A chromatographic packing material for performing high performance liquid chromatography in the reverse phase of polybutadiene coated on alumina in accordance with the present invention provides highly symmetrical chromatographic peaks.

BRIEF DESCRIPTION OF THE DRAWING

The sole FIGURE (Parts A-E) presents a comparison of chromatograms showing chromatographic peaks obtained from commercially available packing materials compared to the novel separations material of the present invention.

DETAILED DESCRIPTION

Figure 1A:
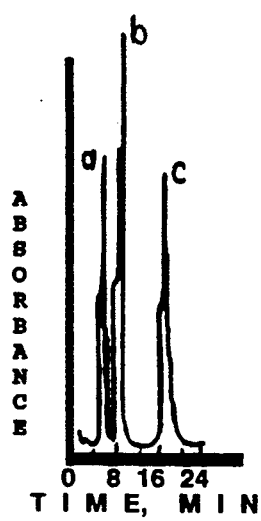

The novel separation materials of the present invention include a stable polybutadiene coated and cross-linked on a particular alumina. The particular alumina of the present invention is characterized as a generally spherical aluminum oxide particle comprised of solid crystals of aluminum oxide with the crystals extending radially outward from a central core region and having a shape selected from principally acicular to principally lamellar. The material of the present invention is synthesized by coating and immobilizing polybutadiene on said alumina. The immobilization is achieved by crosslinking with chemical radical reactions, initiated by thermal decomposition of radical starters (generators) such as including dicumylperoxide. The separations material of the present invention includes polybutadiene in the amount of 5-20% by weight and preferably 8-10% by weight on the particular alumina in accordance with the present invention.

The present invention includes a stable polybutadiene coated and crosslinked on an alumina support base wherein the alumina contains acicular or lamellar alumina and is characterized as an alumina having a habit or form of crystals formed during a precipitation of aluminum hydroxide from an alkali metal aluminate by preselecting and controlling the pH of the alkali metal aluminate and the addition of certain monohydric and polyhydric alcohols to the alkali metal aluminate solution. Precipitation is controlled to form crystals having a habit or form which varies from principally acicular to principally lamellar crystal forms. The term "particle morphology" or "habit" are synonymous with the shape or form of a crystal, e.g., lamellar, tabular, equant, columnar, or acicular, as opposed to the crystal structure or system, e.g., tetragonal, orthorhombic, or monoclinic. While the crystal structure determines the number and types of crystalline faces, the morphology or habit is determined by the relative growth rates of the crystalline faces, with the fastest growing faces disappearing while slower growing faces define the final shape. This alumina is formed by controlling the morphology or habit of aluminum hydroxide crystals to permit the respective free production of crystals which are principally lamellar in the form of flat platelets or principally acicular in the form of needle-like structures as well as intermediate forms. The alumina used in the present invention sometimes is referred to as Alcoa Wilhelmy alumina. A more complete description of the alumina is provided in the related co-pending U.S. patent application by Richard B. Wilhelmy, U.S. Ser. No. 022,735 filed Mar. 6, 1987, which is hereby incorporated by reference and intended to be a part hereof as if it had been included in its entirety. This patent application, U.S. Ser. No. 022,735, currently is under notice of allowance.

The present invention includes the production of a uniform, crosslinked polybutadiene coating on the particular alumina particles by producing a polybutadiene coating and immobilizing the polybutadiene coating on the alumina by polymeric crosslinking. Immobilization in the present invention is performed by crosslinking with radical reactions, initiated by a thermal decomposition of radical starter. In one aspect, the radical starter can be provided by dicumylperoxide.

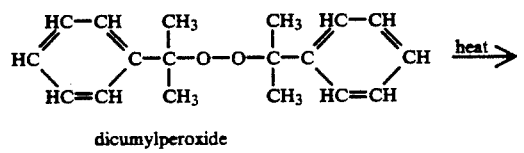
dicumylperoxide

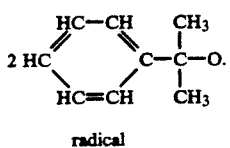
radical

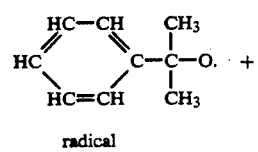
radical

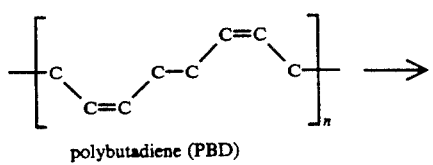
polybutadiene (PBD)

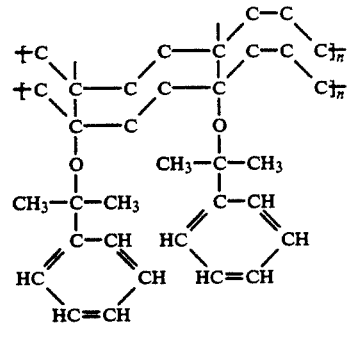
cross-linked polybutadiene
ON ALUMINA SUBSTRATE

The present invention provides novel separations materials which are particularly useful as stable alumina-based reverse phase packing material for liquid chromatography. The material of the present invention is prepared by coating and immobilizing polybutadiene on the particular alumina of the present invention, and several important factors must be controlled in the preparation of stable and efficient polymer coated and crosslinked reverse phase packing material. My related co-pending U.S. patent application filed on even date herewith discloses producing the material of the present invention and is hereby incorporated by reference.

The alumina-based separations media in accordance with the present invention have many advantages over silica for liquid chromatographic applications. The advantages of using the alumina-based supported separations media of the present invention include a wide pH stability for the separation of many acidic and basic compounds by ion-suppression rather than by ion-pairing techniques. The advantages of the present invention further include a low pressure drop requirement for chromatography column process applications.

The chromatographic behavior of this packing material has been tested extensively for efficiency, selectivity, and stability, both in long term stability and chemical stability in comparison with various reverse phase packings. The packing material of the present invention outperforms silica-based reverse phase packings with a lower pressure drop, wider pH stability, and less peak tailing for the separation of basic compounds. Separations for aromatics, anilines, purines, pyrimidines, and nucleosides have been found to provide good resolution with the packing material of the present invention. My related copending U.S. patent application filed on even date herewith discloses process parameters in high performance liquid chromatography in the reverse phase for using chromatographic packing materials in accordance with the present invention.

In contrast to the silica-based support material for chromatography, the present invention provides novel separation materials of polybutadiene on alumina which is stable at a relatively high pH. The present invention provides a material useful over a wide pH range, e.g., such as 2-12. The present invention also provides a material which overcomes the problems associated with alumina-based support materials in forming a hydrophobic phase. The present invention provides a material which has only low pressure drop requirements in packed columns.

The chromatography column can be packed, by way of example, using a 20 ml sample of isopropyl alcohol containing about 2-3 g of particles sonicated for at least 15 minutes and added to the packing reservoir, the reservoir being connected to the column arranged in downward configuration. Coated particles are forced into the column at 6,000 psi with methanol as a loading solvent. Packing should be consolidated until a constant flow rate of methanol reaches equilibrium (approximately 10 minutes). Pressure should be allowed to bleed off the outlet, and the column disconnected from the packer. Excess particles can be scraped carefully from the top face of the column, and a fitting containing a stainless steel frit attached to the column inlet.

Referring to the Figure, chromatograms (from published literature) are depicted for the separation of aniline, n-methylaniline, and n,n-dimethylaniline on various packing materials including adamantyl bonded on silica (A), octadecyl bonded on silica (B), octyl bonded on silica (C), octyl bonded on silica (D), and (from experimental using a Beckman liquid chromatograph) for polybutadiene coated and crosslinked Wilhelmy alumina. Peak shapes obtained from the stable polybutadiene coated and crosslinked alumina in accordance with the present invention were superior to those obtained from adamantyl or the commercially available octyl or octadecyl bonded on silica. Superior is determined by a tailing characteristic for each solute evaluated by calculating the asymmetric factor as the ratio of rear or tailing part to the front part of the peak at 10% peak height. Calculations of this characteristic factor are presented in Table I. Table I presents asymmetry factors for the packing material of the present invention compared to various prior art reverse phase packing materials including adamantyl bonded on silica, octadecyl bonded on silica, and octyl bonded on silica. The prior art asymmetry factors are taken from published literature. All asymmetry factors were obtained under identical mobile phase composition (50% water/50% methanol) for all the columns.

TABLE I

| Packing | Solutes | | | | | | |
|---|---|---|---|---|---|---|---|
| | aniline | n-methylaniline | n,n-dimethylaniline | p-toluidine | o-toluidine | m-toluidine | p-chloroaniline |
| adamantyl (10 μm) | 2.4 | 2.7 | 3.3 | 4.0 | 2.8 | 3.0 | 1.9 |
| octadecyl (5 μm) | 12.8 | 14.8 | 17.0 | 4.9 | 9.0 | 5.1 | 4.3 |
| octyl (5 μm) | 7.5 | 13.4 | 14.3 | 13.2 | 8.5 | 11.1 | 5.9 |
| octyl (5 μm) | 4.3 | 4.4 | 5.3 | 6.0 | 5.1 | 4.1 | 3.4 |
| octadecyl (5 μm) | 14.2 | 12.9 | 16.2 | 19.6 | 5.2 | 6.9 | 4.1 |
| octyldecyl (5 μm) | 7.9 | 8.1 | 15.2 | 17.4 | 8.4 | 11.7 | 4.1 |
| octadecyl (5 μm) | 10.1 | 11.5 | 13.1 | 9.8 | 5.5 | 3.1 | 3.5 |
| octyl (10 μm) | 11.1 | 11.2 | 13.7 | 5.5 | 9.8 | 7.5 | 7.5 |
| octadecyl (3 μm) | 18.8 | 23.5 | 28.0 | 18.7 | 21.8 | 20.2 | 16.1 |
| PBD coated and crosslinked on Wilhelmy Alumina | 1.1 | 2.0 | 2.3 | 1.5 | 2.2 | 1.9 | 1.6 |

EXAMPLE 1

Varying amounts of three to fifteen grams (3-15 g) of alumina sometimes referred to as Wilhelmy alumina or Alcoa Wilhelmy alumina obtained from the Alcoa Technical Center, Alcoa Center, Pa. 15069 were suspended in a 250 ml round flask in 100-150 ml of n-pentane solution containing 10% to 20% by weight of polybutadiene oligomer (molecular weight of about 3400) and 2% of dicumylperoxide by weight with respect to the polybutadiene. Polybutadiene was phenyl terminated, 99% unsaturated, 25% vinyl, 40% trans-1,4, average molecular weight of about 3400 and 45% vinyl, 55% sis and trans 1,4, average molecular weight of about 4500.

Sonication was applied to the mixture for about 30 minutes. The pentane was evaporated slowly with the rotary evaporator connected to an aspirator to accelerate the evaporation process. The evaporation process was carried out at ambient temperature to prevent losing the activity of dicumylperoxide. The polybutadiene coated alumina was transferred into a stainless steel column and purged with dry nitrogen at a flow rate of about 10 ml per minute overnight. Crosslinking was performed by elevating the oven temperature to about 170° C. at a rate of about 5° C. per minute and held for 2 hours. Polymer coating and crosslinked particles produced by this procedure were washed with up to about 200 ml each of heptane and methylene chloride to remove unreacted polybutadiene. The washed particles were placed into the flask and dried with a rotary evaporator for at least about 4 hours. The polybutadiene coated Alcoa Wilhelmy alumina was analyzed and the physical characterization of the particles is presented in Table II.

TABLE II

Physical Characteristics of Alcoa Wilhelmy Alumina Before and After PBD Coating

| Parameter | PBD Coating | |
|---|---|---|
| | before | after |
| % PBD Loading | 0 | 9% |
| Average Particle Diameter, micrometers | 9 | 9 |

TABLE II-continued

Physical Characteristics of Alcoa Wilhelmy Alumina Before and After PBD Coating

| Parameter | PBD Coating before | PBD Coating after |
|---|---|---|
| Surface Area, m²/g | 37.12 | 29.58 |

Figure 1B:
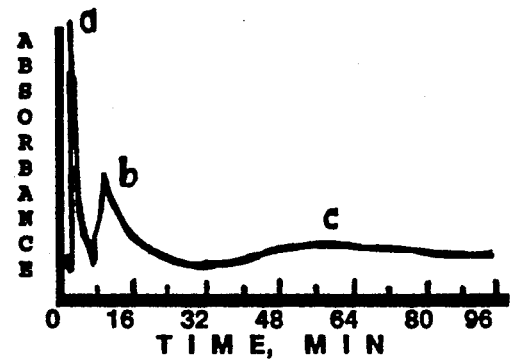
Figure 1C:
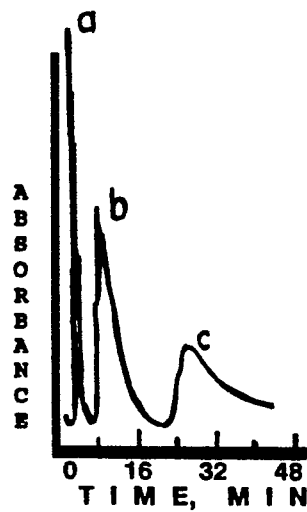
Figure 1D:
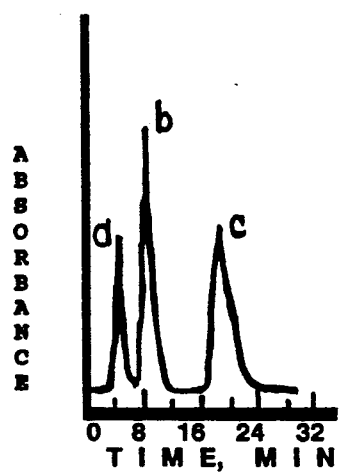
Figure 1E:
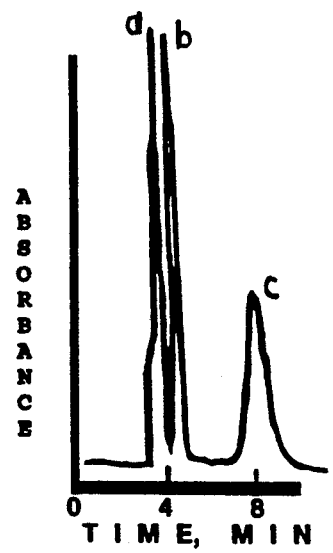

Particle size generally did not change before and after coating. The accumulative mass percent particle size distribution plots for the Alcoa Wilhelmy alumina before and after polybutadiene coating are illustrated in FIG. 1. The average particle size of the Alcoa Wilhelmy alumina was around 9 microns, and at least 50% of the particles were in the size range of 8 to 10 microns.

A scanning electron micrograph of polybutadiene coated Alcoa Wilhelmy alumina revealed no structural defects of particles after coating and crosslinking (from the spherical and relatively narrow particle size distribution of bare Alcoa Wilhelmy alumina).

Surface area was determined by nitrogen BET. The surface areas of bare Alcoa Wilhelmy particles and 9% polybutadiene coated Alcoa Wilhelmy particles were about 37.12 m²/g and about 29.58 m²/g, respectively. A decrease of about 20% was observed after coating. The decrease of surface area was attributable to the plugging of small pores by the polybutadiene oligomers. Smaller molecular weight polybutadiene oligomer can be used to reduce pore plugging.

EXAMPLE 2

Basic compounds have severe peak asymmetry problems for octadecylsilyl bonded on silica in packed columns. The effect is attributable to the presence of residual, non-silylated, silanol groups on the surface of column material. Some ways to overcome peak tailing problems are end capping the surface silanols by reacting derivatized surfaces with a smaller molecule silanizing reagent, such as trimethylchlorosilane, using mobile phase additives to reduce the concentration of accessible silanols by strongly sorbing to the surface, and via steric exclusion of the solutes from reaching the surface of column material. Although improvements in peak symmetry have been obtained, these approaches do not provide a total solution to the tailing problems. To test the performance of the stable polybutadiene (PDD) coated Alcoa Wilhelmy particles of the present invention, aniline, n-methylaniline, n,n-dimethylaniline, o-toluidine, m-toluidine, p-toluidine, and p-chloroaniline were used. The Figure illustrates the chromatograms obtained from adamantyl (A), octadecyl (B), octyl (C), octyl (D), and PBD coated Alcoa Wilhelmy particle phases for the separation of aniline, n-methylaniline, and n,n-dimethylaniline. The peak shapes obtained from the PBD coated Alcoa Wilhelmy particle column were superior to those obtained from either adamantyl or the commercially available octyl or octadecyl phases. The peak tailing characteristic for each solute was evaluated by calculating the asymmetric factor as the ratio of rear part to the front part of peak at 10 percent peak height. Results from this calculation are listed in Table I hereinabove. Columns are either made (adamantyl) or tested of commercial columns (including IBM octadecyl, IBM octyl, Altex Ultrasphere octyl, Alter Ultrasphere octadecyl, Supelco octadecyl, octyl, Hibar octyl, Perkin-Elmer octadecyl phases). All the asymmetry factors obtained were under identical mobile phase composition (50 percent H₂O/50 percent M$_e$OH) for all the columns. Asymmetry factors for the novel composition of the present invention are much smaller than those obtained from the adamantyl column or any commercial column.

While the invention has been described in terms of preferred embodiments, the claims appended hereto are intended to encompass all embodiments which fall within the spirit of the invention.

What is claimed is:

1. A composition of matter useful as separations media in a packed separations column comprising a stable layer of polybutadiene coated and crosslinked on a surface of generally spherical alumina/aluminum hydroxide support particles comprised of crystals of alumina/aluminum hydroxide with the crystals extending radially outward from the central core region and having a shape selected from principally acicular to principally lamellar.

2. A composition as set forth in claim 1 wherein said polybutadiene comprises about 5-20% by weight of said composition.

3. A composition as set forth in claim 2 wherein said polybutadiene comprises about 8-10% by weight of said composition.

4. A composition as set forth in claim 3 wherein said polybutadiene forms a substantially homogeneous film layer on said composition.

5. A composition as set forth in claim 4 wherein said film layer is substantially uniform.

6. A composition as set forth in claim 5 further comprising an average particle size of about 9 micrometers, 50% of the particle size in the range of about 8-10 micrometers.

7. A composition as set forth in claim 6 wherein said composition has a surface area in the range of about 20-50 m²/g.

8. A composition as set forth in claim 7 wherein said surface area is in the range of about 30-40 m²/g.

9. A chromatographic packing material comprising stable polybutadiene coated on a surface of generally spherical alumina consisting of crystals of alumina and aluminum hydroxide extending radially outward from a central core region and having a shape selected from principally acicular to principally lamellar wherein the polybutadiene coating comprises a substantially homogeneous film having a uniform polymer crosslinking layer.

10. A material as set forth in claim 9 wherein said polybutadiene comprises about 5-20% by weight of said composition.

11. A material as set forth in claim 10 wherein said polybutadiene comprises about 8-10% by weight of said composition.

12. A material as set forth in claim 11 wherein said polybutadiene forms a homogeneous film layer on said composition.

13. A material as set forth in claim 12 wherein said film layer is uniform.

14. A material as set forth in claim 13 further comprising an average particle size of about 9 micrometers, 50% of the particle size in the range of about 8-10 micrometers.

15. A material as set forth in claim 14 wherein said composition has a surface area in the range of about 20-50 m²/g.

16. A material as set forth in claim 15 wherein said surface area is in the range of about 30-40 m²/g.

17. A chromatographic packing material consisting essentially of stable polybutadiene coated and crosslinked on a surface of generally spherical alumina consisting of crystals of alumina and aluminum hydroxide extending radially outward from a central core region and having a shape selected from principally acicular to principally lamellar wherein the polybutadiene coating comprises a substantially homogeneous film having a uniform polymer crosslinking layer to form particles having average sizes in the range of about 8-10 micrometers with a surface area in the range of about 20-50 micrometers.

18. A material as set forth in claim 17 wherein said polybutadiene comprises about 8-10% by weight of said composition.

* * * * *